United States Patent
Thacker et al.

(10) Patent No.: US 7,319,454 B2
(45) Date of Patent: Jan. 15, 2008

(54) TWO-BUTTON MOUSE INPUT USING A STYLUS

(75) Inventors: Charles Patrick Thacker, Palo Alto, CA (US); James E. Mathews, Bellevue, WA (US); Luis Huapaya, Bellevue, WA (US); Butler Wright Lampson, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 21 days.

(21) Appl. No.: 09/801,929

(22) Filed: Mar. 9, 2001

(65) Prior Publication Data

US 2002/0057262 A1    May 16, 2002

Related U.S. Application Data

(60) Provisional application No. 60/247,843, filed on Nov. 10, 2000.

(51) Int. Cl.
G09G 5/08 (2006.01)
G09G 5/00 (2006.01)

(52) U.S. Cl. .................... 345/163; 345/173; 715/773

(58) Field of Classification Search ............ 345/163, 345/173, 179, 864; 715/864, 773
See application file for complete search history.

(56) References Cited

U.S. PATENT DOCUMENTS

| | | | | |
|---|---|---|---|---|
| 5,500,935 A | * | 3/1996 | Moran et al. | 345/863 |
| 5,603,053 A | * | 2/1997 | Gough et al. | 710/5 |
| 5,612,719 A | * | 3/1997 | Beernink et al. | 345/173 |
| 6,018,336 A | * | 1/2000 | Akiyama et al. | 345/173 |
| 6,262,719 B1 | * | 7/2001 | Bi et al. | 345/179 |
| 6,757,002 B1 | * | 6/2004 | Oross et al. | 345/864 |
| 6,903,730 B2 | * | 6/2005 | Mathews et al. | 345/179 |

* cited by examiner

*Primary Examiner*—Jimmy H. Nguyen

(74) *Attorney, Agent, or Firm*—Birch, Stewart, Kolasch & Birch, LLP

(57) ABSTRACT

A system and method for emulating the functional behavior of a two-button mouse-type computer input device is described. A predetermined input generated by digitizing pen and a digitizing writing surface is received, and a user interface having a plurality of soft buttons is displayed. The plurality of soft buttons provides selectable functionality of a two-button mouse-type computer input device. Preferably, the plurality of soft buttons includes a right-button function, a shift function, a control function, an alternate function and a bull's-eye function.

30 Claims, 4 Drawing Sheets

TWO-BUTTON MOUSE INPUT USING A STYLUS

CROSS-REFERENCE TO RELATED APPLICATIONS

The present application claims priority to U.S. Provisional Patent Application Ser. No. 60/247,843, entitled Mouse Input Panel And User Interface, filed on Nov. 10, 2000, which is hereby incorporated by reference as to its entirety. The present application is related to U.S. Provisional Patent Application Ser. No. 60/247,182, entitled Method and Apparatus For Improving the Appearance of Digitally Represented Handwriting, filed on Nov. 10, 2000; to U.S. Provisional Patent Application Ser. No. 60/247,841, entitled Highlevel Active Pen Matrix, and filed on Nov. 10, 2000; to U.S. Provisional Patent Application Ser. No. 60/247,973, entitled Selection Handles in Editing Electronic Documents, and filed on Nov. 10, 2000; to U.S. Provisional Patent Application Ser. No. 60/247,842, entitled Insertion Point Bungee Space Tool, and filed on Nov. 10, 2000; to U.S. patent application Ser. No. 09/768,171, entitled Selection Handles In Editing Documents, and filed Jan. 24, 2001; to U.S. Provisional Patent Application Ser. No. 60/247,844, entitled Simulating Gestures of a Mouse Using a Stylus and Providing Feedback Thereto, and filed on Nov. 10, 2000; to U.S. Provisional Patent Application Ser. No. 60/247,400, entitled System and Method For Accepting Disparate Types Of User Input, and filed on Nov. 10, 2000; to U.S. Provisional Patent Application Ser. No. 60/247,972, entitled In Air Gestures, and filed on Nov. 10, 2000; to U.S. patent application Ser. No. 09/759,202, entitled In-Air Gestures For Electromagnetic Coordinate Digitizers, and filed Jan. 15, 2001; to U.S. Provisional Patent Application Ser. No. 60/247,831, entitled Mouse Input Panel Windows Class List, and filed on Nov. 10, 2000; to U.S. patent application Ser. No. 09/801,880, entitled Mouse Input Panel Windows Class List, and filed Mar. 9, 2001; to U.S. Provisional Patent Application Ser. No. 60/247,843, entitled Mouse Input Panel and User Interface, and filed on Nov. 10, 2000; to U.S. Provisional Patent Application Ser. No. 60/247,479, entitled System and Method For Inserting Implicit Page Breaks, and filed on Nov. 10, 2000; to U.S. patent application Ser. No. 09/736,170, entitled High Level Active Pen Matrix, and filed on Dec. 15, 2000; to U.S. patent application Ser. No. 09/741,107, entitled Mode Hinting/Switching, and filed on Dec. 21, 2000; to U.S. Provisional Patent Application Ser. No. 60/247,847, entitled Tablet Computer and its Features, and filed on Nov. 10, 2000; and to U.S. patent application Ser. No. 09/750,288, entitled Anchoring, Rendering, Reflow & Transformations, filed Dec. 29, 2000, each of which is incorporated by reference herein as to their entireties.

BACKGROUND OF THE INVENTION

1. Field of the Invention

The present invention relates to computing devices. More particularly, the present invention relates to a system and method for generating an input having predefined characteristics for a computing system.

2. Description of the Related Art

Most personal computer (PC) systems provide a plurality of techniques for a user to enter data and commands, and to manipulate data. One exemplary technique is for a user to enter data and command using a keyboard. Other exemplary techniques include use of a mouse, a track ball, and/or a voice-actuated input device. Yet another technique involves a using a digitizing writing pad and a stylus.

In the situation when a conventional computer system has a digitizing writing pad and stylus, and a user would like to utilize the functionality that is associated with a mouse that is not available through the digitizing writing pad and stylus, the user must stop using the digitizing writing pad and style and begin to use the mouse. For example, when a user would like to control the behavior of the computer system using the functionality provided by the left- and right-buttons of a two-button mouse, the user must stop using the digitizing writing pad and stylus and use the mouse, or using the stylus to select the desired function from a sequence of menu selections. A change from a stylus to a mouse is time consuming for the user because the user must refocus attention from one input device to another. Further, many times switching from one input device to another can be awkward or the computer system may be configured so that a mouse-type input device is not connected. Selecting a desired function from a sequence of menu selection can be plainly inconvenient.

Thus, what is needed is a way for a user to control the behavior of a pen-based computing device input data so that a pen-based computing device can emulate the functional behavior of a mouse-type computer input device.

SUMMARY OF THE INVENTION

The present invention provides a new class of control behaviors for pen-based computing devices. These behaviors are easily recognized by a computer and provide a convenient way for users to control or invoke certain functions.

The advantages of the present invention are provided by a method for detecting an in-air gesture. An in-air gesture is a certain prescribed movement made by a user of a pen or stylus that is proximate to, but not in contact with, the display screen of a computer that allows pen input. An in-air gesture is easy for the system to distinguish from control commands of prior devices because the lack of contact between pen and display clearly distinguishes this class of behaviors from prior control behaviors. In-air gestures also provide easy and quick access to system functionality in a way that is more direct than in existing control methods.

Computers that are configured without traditional keyboard and mouse input devices and that have relatively large displays are sometimes referred to as tablet PCs. More generically, tablet PCs belong to the group of stylus-based computing systems. These computing systems are typically configured so that a digitizer is combined with or overlaid upon the display. The digitizer senses the coordinates of a pen tip as the pen is moved in contact with the display surface. When electromagnetic displays and pens are used, the stylus-based computing system can sense proximity of the pen to the display in addition to sensing just contact between the pen and the display.

The present invention also provides a way for an electromagnetic pen digitizer to precisely emulate the functional behavior of a two-button mouse-type computer input device. According to the invention, a predetermined input generated by digitizing pen and a digitizing writing surface is received, and a user interface having a plurality of soft buttons is displayed in response to the predetermined input. The plurality of soft buttons provides selectable functionality of a two-button mouse-type computer input device. Preferably, the plurality of soft buttons includes a right-button function, a shift function, a control function, an alternate function and a bull's-eye function. An inactivity timer is started when the user interface is displayed; and when a user selection is not received before a predetermined amount of time elapses, the user interface is hidden. Depending on a received user selection of at least one of the plurality of soft buttons, the user interface can continued to be displayed for further user selections or can be hidden. When the user selection is for the bull's-eye function, the invention sends a right-button event to an application displayed below the user interface.

The present invention also provides a tablet PC having a digitizing writing surface that generates a predetermined output in response to, for example, a predetermined in-air gesture made with a digitizing pen, and a display that displays a user interface having a plurality of soft buttons in response to the predetermined output. The plurality of soft buttons provides selectable functionality of a two-button mouse-type computer input device. Preferably, the plurality of soft buttons includes a right-button function, a shift function, a control function, an alternate function and a bull's-eye function. The digitizing writing surface receives a user selection of at least one of the plurality of soft buttons, and the user interface is hidden from view on the display when the user selection of a selected soft button is received. When the digitizing display receives a user selection for the bull's-eye function; the stylus-based computing system sends a right-button event to an application displayed below the user interface on the display in response to the user selection for the bull's-eye function. An inactivity timer is started when the user interface is displayed on the display, and the user interface is hidden from view on the display when a predetermined amount of time elapses without receiving a user selection of at least one of the plurality of soft buttons.

BRIEF DESCRIPTION OF THE DRAWINGS

Aspects of the present invention are illustrated by way of example and not limitation in the accompanying figures in which like reference numerals indicate similar elements and in which.

DETAILED DESCRIPTION

Figure 1:
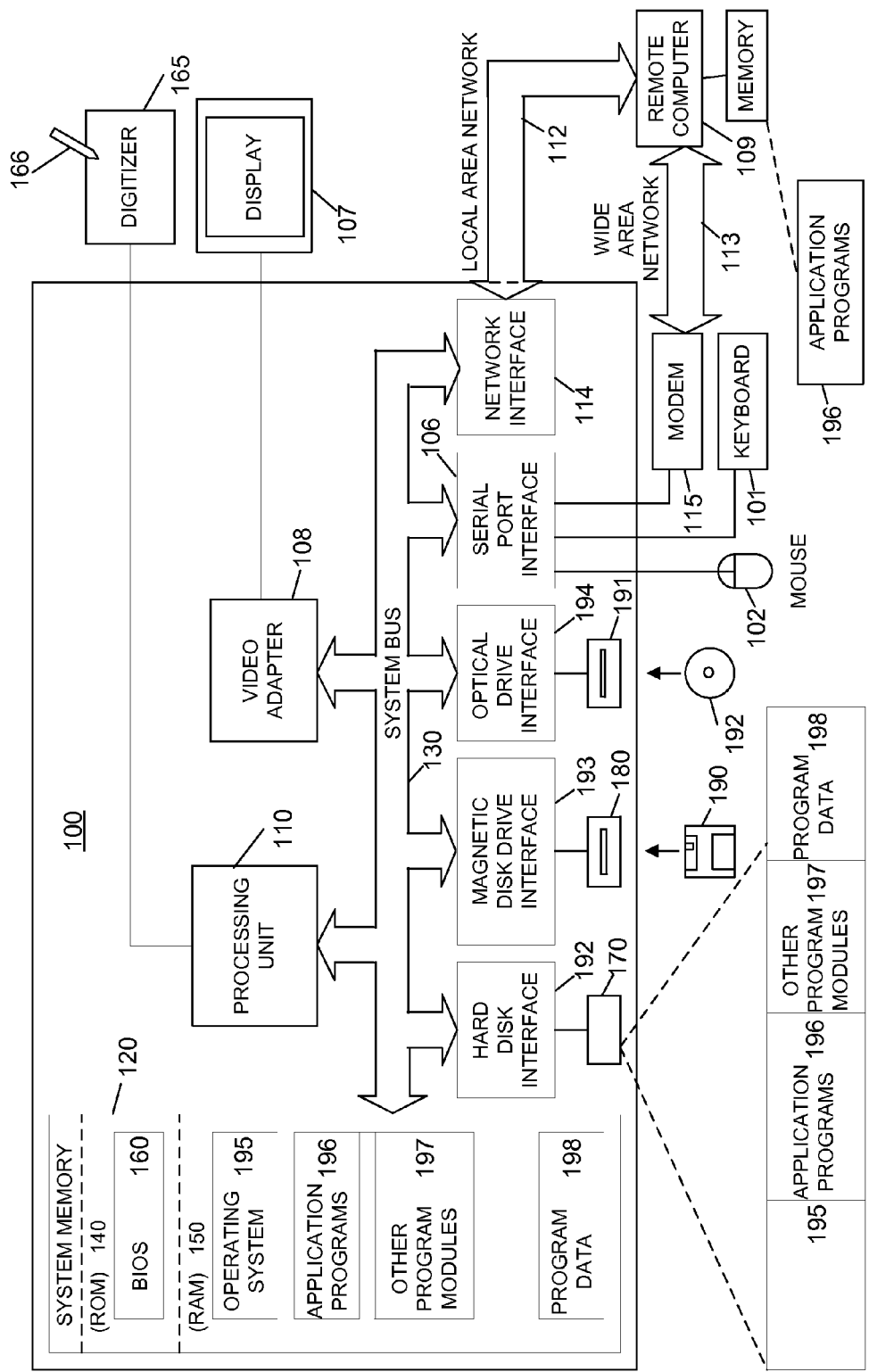
FIG. 1 shows a schematic diagram of a general-purpose digital computing environment that can be used for implementing various aspects of the invention.

The present invention may be more readily described with reference to FIG. 1-5. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to processing unit 110. System bus 130 may be any of several types of bus structures including a memory bus or memory controller, a peripheral bus, and a local bus using any of a variety of bus architectures. System memory 120 includes read only memory (ROM) 140 and random access memory (RAM) 150.

A basic input/output system 160 (BIOS), containing the basic routines that help to transfer information between elements within computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. Hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on hard disk drive 170, magnetic disk 190, optical disk 192, ROM 140 or RAM 150, including an operating system 195, one or more application programs 196, other program modules 197, and program data 198. A user can enter commands and information into computer 100 through input devices such as a keyboard 101 and pointing device 102. Other input devices (not shown) may include a microphone, joystick, game pad, satellite dish, scanner or the like. These and other input devices are often connected to processing unit 110 through a serial port interface 106 that is coupled to the system bus, but may be connected by other interfaces, such as a parallel port, game port or a universal serial bus (USB). Further still, these devices may be coupled directly to system bus 130 via an appropriate interface (not shown). A monitor 107 or other type of display device is also connected to system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between pen digitizer 165 and processing unit 110 is shown, in practice, pen digitizer 165 may be coupled to processing unit 110 via a serial port, parallel port or other interface and system bus 130 as known in the art. Furthermore, although digitizer 165 is shown apart from monitor 107, it is preferred that the usable input area of digitizer 165 be co-extensive with the display area of monitor 107. Further still, digitizer 165 may be integrated in monitor 107, or may exist as a separate device overlaying or otherwise appended to monitor 107.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other device for establishing a communications over wide area network 113, such as the Internet. Modem 115, which may be internal or external, is connected to system bus 130 via the serial port interface 106. In a networked environment, program modules depicted relative to personal computer 100, or portions thereof, may be stored in a remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
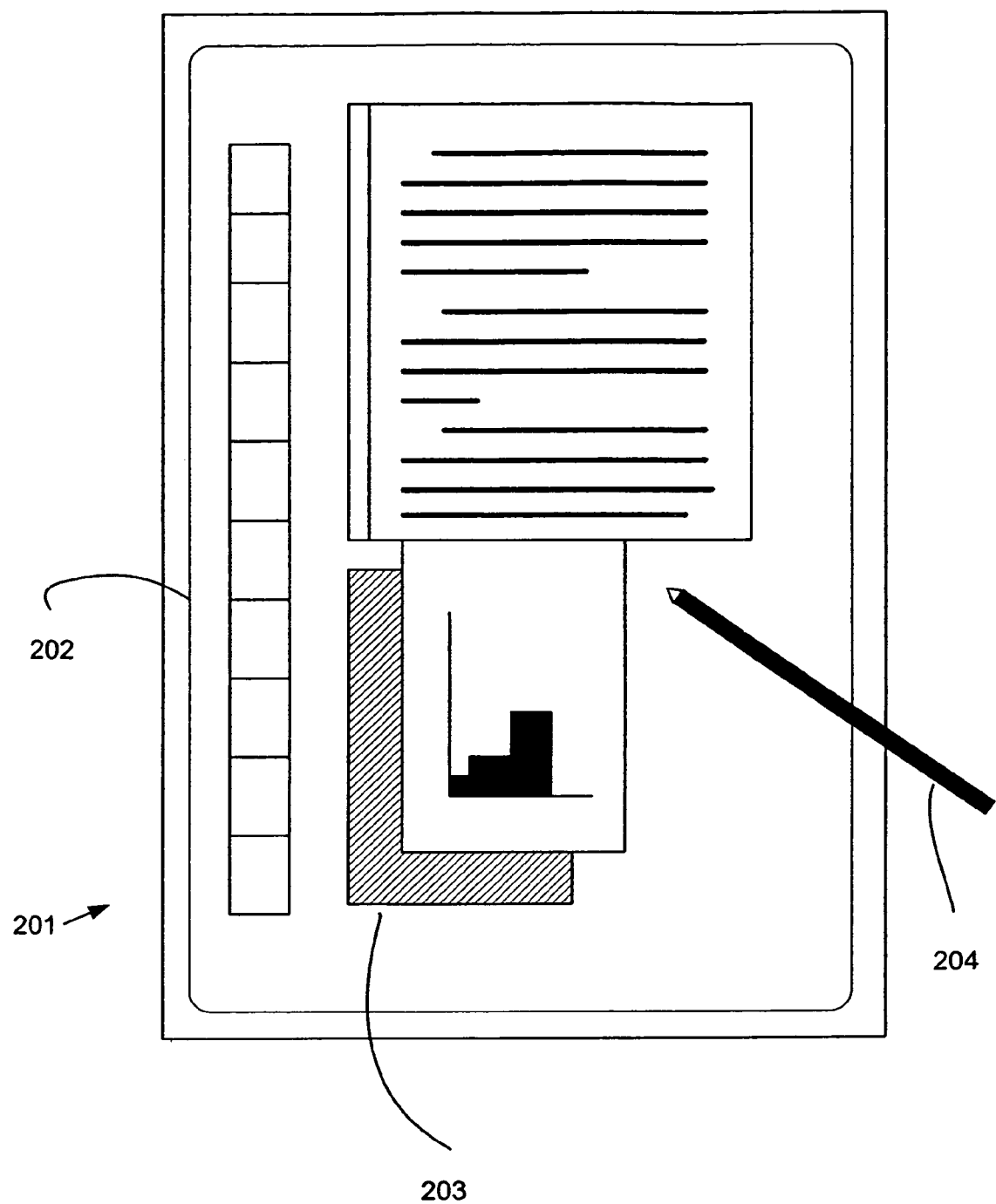
FIG. 2 shows a tablet and stylus computer that can be used in accordance with various aspects of the present invention.

FIG. 2 illustrates a stylus-based computing system 201 that can be used in accordance with various aspects of the present invention. Any or all of the features, subsystems, and functions in the system of FIG. 1 can be included in the computer of FIG. 2. Stylus-based computing system 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Stylus-based computing system 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

A primary aspect of the invention provides a technique for emulating the functional behavior of a two-button mouse-type computer input device with a tablet PC using a pen or stylus as the input device. The user interface (UI) element of the invention, described in further detail with respect to FIG. 3 below and referred to herein as a mouse input panel (MIP), allows a user to quickly access the functional behavior of a two-button mouse. The functional behavior of a two-button mouse to be emulated by the pen and the MIP includes positional information, and an actuation signal for each button of the two buttons (i.e., left- and right-button down events). Also, two keyboard keys (SHIFT and CTRL) commonly used for modifying the functional behavior of the two buttons of mouse input device can be actuated using the MIP of the invention. Accordingly, an application program that is designed to operate with input from a two-button mouse input device and, therefore, expects a variety of mouse events can be operated using a digitizing pen without modification of the application program.

The MIP of the present invention can be invoked, i.e., made to appear on the display of the stylus-based computing system, in a number of different ways. One way is for a user to press a button that represents the MIP on a toolbar visible on the display. This, however, requires the user's hand to move away from the document or application to which the user's attention is focused to locate and depress the button that invokes the UI element. Another approach that has similar shortcomings is to use a hardware button on the housing of the stylus-based computing system. The preferred alternative for invoking the MIP or other UI elements, or for affecting any other system control or input, is the use of the gesture of the present invention.

According to the invention, "in-air" gestures made with an electromagnetic pen digitizer are detected for emulating the functional behavior of a two-button mouse-type computer input device. When the digitizing pen is detected to be above, but not in contact with, a digitizing writing surface, i.e., in-air, the coordinates of the in-air movements of the pen are recorded. Preferably, approximately the last second of the pen movement coordinate stream is recorded in a buffer in a well-known manner. Each time the motion of the pen is detected to stop, the recorded coordinates of the pen motion are evaluated by a gesture recognizer for determining whether the characteristics of the recorded pen movement matches the characteristics of one of a plurality of pre-defined in-air gestures. When the recorded pen movement matches one of the predefined in-air gestures, an action is executed such as the display of user interface (UI) element, thereby presenting, for example, menu selections that can be selected by a user using the pen.

Preferably, the default event that is sent to an application when the pen touches the writing surface is a "left button down" event. When the pen touch is preceded by a selected in-air gesture, no "left button down" event is sent. Instead, the UI is displayed preferably near the pen tip. For example, a right-handed user can select for the UI to be displayed to the left of the detected pen position. Alternatively, a left-handed user can select for the UI to be displayed to the right of the detected pen position.

A "spike" in-air gesture is an in-air gesture that is easily made and is not likely to be performed accidentally by a user. There are four preferable orientations of the spike gesture that are detected by the present invention. A "down spike" in-air gesture is formed by holding the pen above a digitizing writing surface and moving the pen south (with respect to the north, south, east, west directions of the digitizing writing surface) and then north back to the original position. An "up spike" in-air gesture is formed by holding the pen above the digitizing writing surface and moving the pen north and then south back to the original position. A "right spike" in-air gesture is formed by holding the pen above the digitizing writing surface and moving the pen right and then left back to the original position. A "left spike" in-air gesture is formed by holding the pen above the digitizing writing surface and moving the pen moving left and then right back to the original position.

Figure 3:
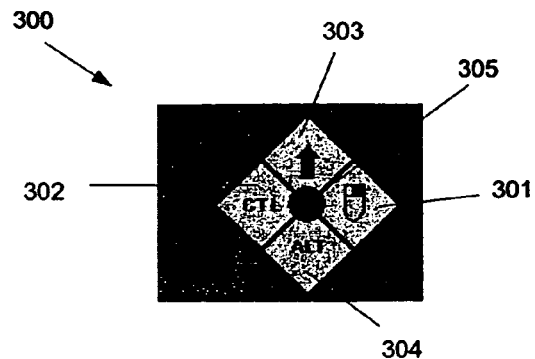
FIG. 3 shows an exemplary user interface (UI) that can be used for emulating the functional behavior of a two-button mouse-type computer input device according to aspects of the present invention.

These and other in-air gestures can be pre-configured, by an application developer or by a user, to produce any desired input to an application or operating system. One preferred use of an in-air gesture is to invoke the MIP. When, for example, a down spike in-air gesture is detected, the MIP UI element is displayed and a user can, using the MIP, select one or more modifiers that can be attached to the next "pen down" action. FIG. 3 shows an exemplary UI element 300 that is displayed when a down spike in-air gesture is detected. FIG. 3 shows that the selections contained in UI element 300 displayed with a down spike in-air gesture are detected include RIGHT 301, CTL 302, SHIFT 303, ALT 304 and BULL'S-EYE 305. When RIGHT 301 is selected, the next pen touch causes a "right button down" event. When CTL 302 is selected, a CTL key accompanies the next pen touch. Similarly, when SHIFT 303 is selected, a SHIFT key accompanies the next pen touch. When BULL'S-EYE 305 is selected, the UI pop-up window is dismissed.

CTL 302, SHIFT 303 and ALT 304 are additional instances of the corresponding modifier buttons on a keyboard. Consequently, CTL 302, SHIFT 303 and ALT 304 are displayed as activated or locked when a corresponding instance is in either state. As soon as UI element 300 becomes visible, an inactivity timer is started. When a user does not tap the pen anywhere within UI element 303 before the inactivity timer expires, UI 300 hides, or disappears from view. Preferably, the duration of the inactivity timer is about 3 seconds. When a user taps the pen tip in the BULL'S-EYE 305, and none of CTL 302, SHIFT 302 and ALT 304 is active, UI 300 sends a right button click event to the window immediately below BULL'S-EYE 305. UI 300 then disappears from view. When one or more of the modifiers CTL 302, SHIFT 303 and ALT 304 is active and a user taps in the pen tip within BULL'S-EYE 305, UI 300 sends a right click event plus the modifier(s) to the window immediately below BULL'S-EYE 305. UI 300 then hides, unless one or more of the modifiers is locked.

When a user taps on one of CTL 302, SHIFT 303 and ALT 304 buttons of UI 300, the selected button flashes, thereby indicating activation. On the next pen down on, for example, a soft keyboard button or any area outside MIP window, UI 300 sends the modified mouse message and deactivates the modifier. A user can lock a modifier on UI 300 by holding on the button until a UI modifier lock time-out expires. Preferably, the duration of the UI modifier lock time out timer is about 1 second. When a user locks a modifier, the locked modifier is preferably displayed having a highlighting color around the perimeter of the locked modifier. For example, in the situation that ALT 304 is locked, a green highlight is displayed around the perimeter of ALT 304. While the button is locked, the UI 300 stays onscreen. The lock is released when the locked modifier is again tapped on. When all locks are released, UI 300 will be hidden from view.

Figure 4:
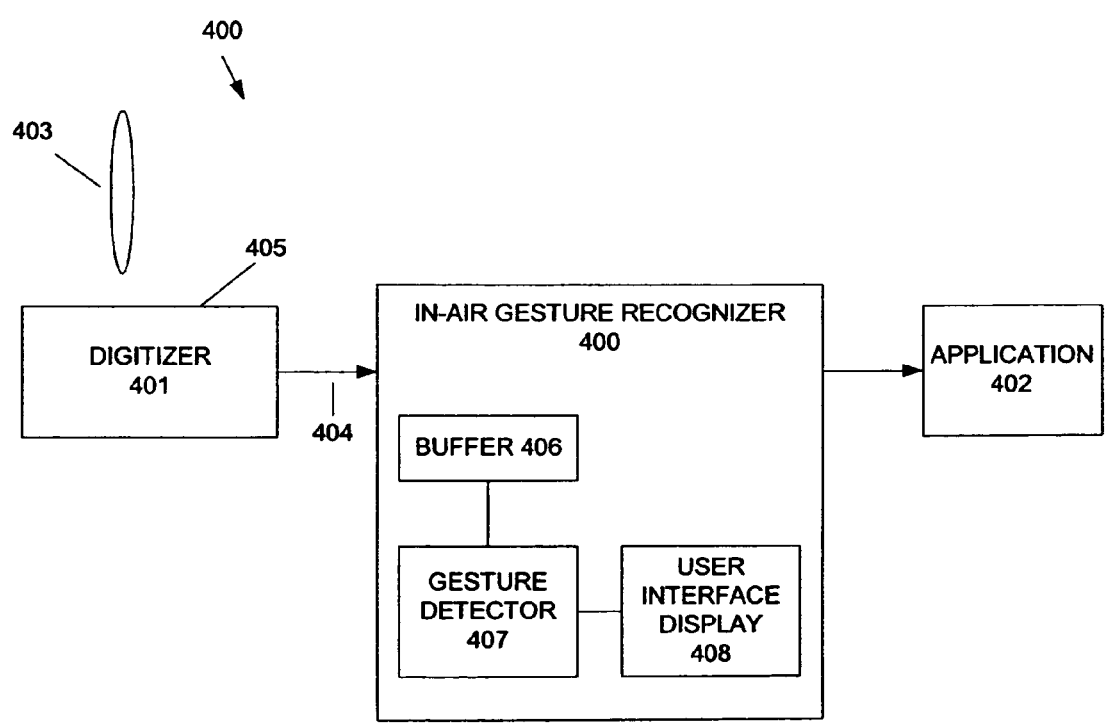
FIG. 4 is a functional block diagram showing the functional relationship of an in-air gesture recognizer according to aspects of the present invention with a pen digitizer and an application program.

FIG. 4 is a functional block diagram showing the functional relationship of an in-air gesture recognizer 400 with a pen digitizer 401 and an application program 402. Pen digitizer 401 generates positional information (i.e., coordinate information) of a pen 403 in the form of a coordinate stream 404. Pen digitizer 401 and pen 403 are preferably components that are part of a conventional electromagnetic pen digitizer system. Coordinate stream 404 includes information relating to whether digitizer pen 403 is in contact with a writing surface 405 of pen digitizer 401, or whether digitizer pen 403 is in proximity above writing surface 405.

When coordinate stream 404 indicates that pen 403 is in proximity above writing surface 405, in-air gesture recognizer 400 records coordinate stream 404 in a buffer 406. Preferably, buffer 406 records approximately the last second of the pen movement coordinate stream in a well-known manner so that about 200 coordinate points are recorded for evaluation. Alternatively, the time span of pen movement information recorded in buffer 406 can be optimized for each user. When in-air gesture recognizer 400 detects that the motion of pen 403 stops, the recorded pen motion coordinate information is evaluated by a gesture detector 407 for determining whether the characteristics of the recorded pen movement match the characteristics of a predefined in-air gesture. More specifically, gesture detector 407 compares recorded motion characteristics, such as motion shape, motion size, start and end points of the motion, and speed of the motion, to corresponding characteristics for a predefined in-air gesture, such as a down spike gesture. Of course, other in-air gestures can be detected using the same technique.

When gesture detector 407 determines that the recorded pen movement matches the predefined in-air gesture for a down spike, a user interface (UI) element 408 is displayed that presents menu selections that can be selected by a user using the pen digitizer. The particular menu selections contained in the UI emulate the functional behavior of a two-button mouse-type computer input device.

Figure 5:
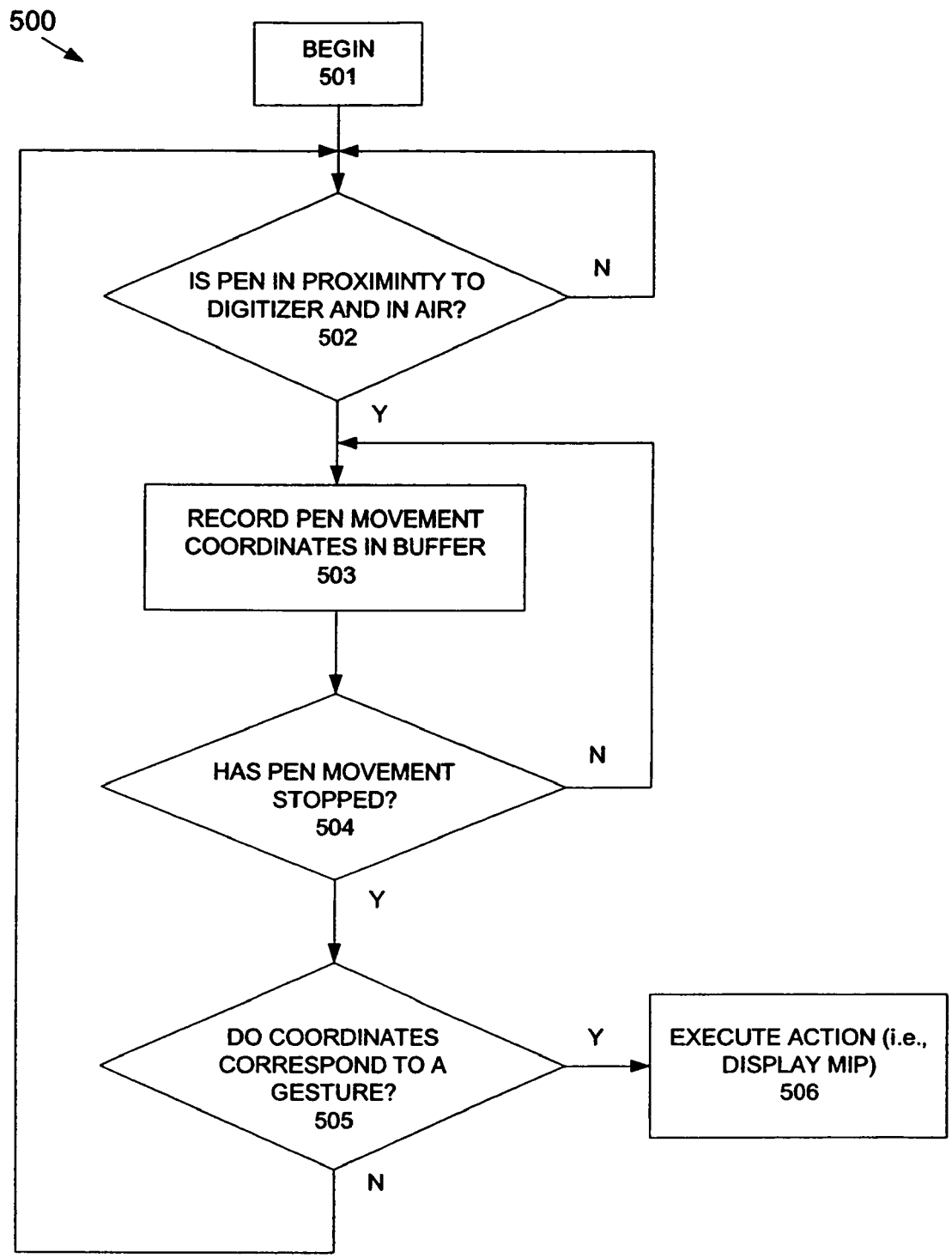
FIG. 5 shows a flow diagram for a process for detecting an in-air gesture and emulating the functional behavior of a two-button mouse-type computer input device according to aspects of the present invention.

FIG. 5 shows a flow diagram 500 for a process for detecting an in-air gesture and emulating the functional behavior of a two-button mouse-type computer input device according to aspects of the present invention. The process begins at step 501. At step 502, it is determined whether the pen is in proximity to and in the air above the digitizing writing surface. If not, the process remains at step 502 until the pen is determined to be in proximity to and in the air above the digitizing writing surface, at which time flow continues to step 503 where the coordinate information stream generated by the in-air gesture of the pen is recorded in buffer 406 (FIG. 4). Flow continues to step 504, where it is determined whether the in-air pen movement has stopped. If not, flow continues to step 503, where the recording of the coordinate information stream generated by the in-air gesture of the pen continues in buffer 406.

If, at step 504, it is determined that the in-air gesture has stopped, flow continues to step 505, where it is determined whether the recorded in-air gesture corresponds to, for example, a down spike in-air gesture. If so, flow continues to step 506, where an action corresponding to the detected in-air gesture is displayed. For example, when a down spike in-air gesture is detected, UI 300 is displayed. Alternatively, a control function can be executed when a particular in-air gesture is detected. If, at step 505, the recorded in-air gesture of the pen does not correspond to a down spike gesture, flow returns to step 502.

As an alternative to the embodiment shown in FIG. 5, the digitizer pen and digitizing writing surface can be configured so that a user manually selects, for example, a button that defines the digitizing pen to be in a hovering state. For this alternative embodiment, the decision made in step 502 would be based on the user-selected state for the pen, i.e., hovering or not hovering.

While the present invention does not rely on complex in-air gestures for emulating the functional behavior of a two-button mouse-type computer input device, other in-air gestures other than spike movements can alternatively be utilized by aspects of the present invention. For example, other suitable in-air gestures that can be used with the present invention include circularly, triangularly, or rectangularly shaped motions, in addition to a saw tooth motion or a reciprocating motion. Moreover, a UI menu or control window other than a mouse-type input panel could be emulated by using an in-air gesture that is detected by aspects of the present invention. Exemplary UI menus or control windows that could be controlled by in-air motions detected by aspects of the present invention include a file management menu, an edit function menu, and a formatting menu. Further still, an in-air gesture according to aspects of the present invention can be used for generating specific keystrokes, such as a space, backspace and carriage return, or user definable keystrokes and/or sequences of keystrokes.

While the present invention has been described in connection with the illustrated embodiments, it will be appreciated and understood that modifications may be made without departing from the true spirit and scope of the invention.

What is claimed is:

1. A method for emulating a keyboard-modified two-button mouse-type computer input device, comprising steps of:
   receiving a first stylus input from a user;
   determining whether the first stylus input is preceded by a predetermined gesture made by the user;
   responsive to determining that the first stylus input is preceded by the predetermined gesture made by the user, displaying a user interface comprising at least one user-selectable keyboard modification function from the group consisting of a shift key function, a control key function, and an alternate key function corresponding to emulations of a shift key, a control key, and an alternate key of a keyboard, respectively;
   receiving a user selection of at least one of the user-selectable keyboard modification functions via a second stylus input;
   receiving a third stylus input from the user to select a bull's-eye function in the user interface; and
   sending, to a location corresponding to the third stylus input, an emulation of a keyboard-modified mouse button event corresponding to a mouse button click modified by the selected at least one user-selected keyboard modification function.

2. The method according to claim 1, further comprising a step of hiding the user interface responsive to receiving the user selection.

3. The method according to claim 1, further comprising steps of:
   starting an inactivity timer when the user interface is displayed; and
   hiding the user interface when a predetermined amount of time elapses without receiving the user selection.

4. A computer-readable medium storing computer-executable instructions for performing the steps recited in claim 1.

5. The computer-readable medium according to claim 4, wherein the stylus input is provided by a digitizing pen and said displaying step displays said user interface at a location on a digitizing writing surface that depends upon a location of the digitizing pen in relation to said digitizing writing surface.

6. The method according to claim 1, wherein the stylus input is provided by a digitizing pen and said displaying step displays said user interface at a location on a digitizing writing surface that depends upon a location of the-digitizing pen in relation to the digitizing writing surface.

7. The method of claim 1, wherein the step of displaying includes displaying the user interface in response to receiving the predetermined gesture made by the user.

8. The method of claim 7, wherein the step of displaying further includes a step of comparing the predetermined gesture made by the user with a set of predetermined gestures, and displaying the user interface in response to receiving the predetermined gesture made by the user if the predetermined gesture made by the user matches one of the set of predetermined gestures but not if the predetermined gesture made by the user does not match one of the set of predetermined gestures.

9. The method of claim 7, wherein the stylus input is provided by a digitizing pen and the predetermined gesture made by the user is an in-air gesture made by the digitizing pen in relation to a digitizing writing surface.

10. A computer having a display and a user input device, configured to perform the steps recited in claim 1.

11. The method of claim 1, wherein the first stylus input is a tap.

12. The method according to claim 1,
    wherein the displayed user interface further comprises a right mouse button function, and
    wherein when a user selects the right mouse button function, the emulation of a modified mouse button event corresponds to a right mouse button click.

13. The method according to claim 1, wherein the emulation of a keyboard modified mouse button event is sent to an application program.

14. A method for emulating a keyboard-modified two-button mouse-type computer input device, comprising steps of:
    displaying a user interface comprising at least one user-selectable keyboard modification function from the group consisting of a shift key function, a control key function, and an alternate key function corresponding to emulations of a shift key, a control key, and an alternate key of a keyboard, respectively, and further comprising a user-selectable bull's-eye function located substantially in the center of the displayed user interface;
    receiving a user selection of at least one of the keyboard modification functions;
    receiving a user selection of the bull's-eye function; and
    sending, in response to receiving the user selection of the bull's-eye function, an emulation of a keyboard-modified mouse button event corresponding to a right mouse button click modified by the selected at least one keyboard modification function.

15. The method according to claim 14, further comprising the step of:
    ceasing to display the user interface in response to receiving the user selection of the bull's-eye function.

16. The method according to claim 14, wherein the emulation of a keyboard modified mouse button event is sent to an application program.

17. The method according to claim 16, wherein said application program is associated with a window displayed immediately below said user-selectable bull's-eye function.

18. In a stylus-based computer, a method for emulating a keyboard-modified mouse-type computer input device, comprising steps of:
    receiving a first stylus input from a user;
    determining whether the first stylus input is preceded by a particular in-air gesture;
    responsive to determining that the first stylus input is preceded by the particular in-air gesture, displaying a graphical user interface including at least one user-selectable keyboard function corresponding to an input modification key of a keyboard;
    detecting a first user interaction with the graphical user interface to select at least one of said keyboard functions; and responsive to a second stylus input to select a bull's-eye function in the graphical user interface, sending an emulation of a modified mouse button event modified in accordance with the at least one user-selected keyboard function.

19. The method of claim 18, wherein the keyboard function is a Shift key function.

20. The method of claim 18, wherein the keyboard function is a Control key function.

21. The method of claim 18, wherein the keyboard function is an Alternate key function.

22. The method of claim 18, wherein the first user interaction is a stylus-based user input.

23. The method of claim 18, wherein the first stylus input is a tap of the stylus on a touch-sensitive display.

24. The method of claim 18, wherein the step of displaying includes displaying the graphical user interface at a location of a stylus-sensitive display that depends upon a location of the stylus relative to the display.

25. The method of claim 18, further including a step of removing the graphical user interface from being displayed responsive to the stylus input.

26. The method of claim 18, wherein the step of sending includes sending the mouse button event modified in accordance with the user-selected keyboard function to a running application.

27. The method of claim 18, further including a step of locking the user-selectable keyboard function in response to a second user interaction with the graphical user interface.

28. The method of claim 27, further including a step of unlocking the user-selectable keyboard function in response to a third user interaction with the graphical user interface.

29. A computer-readable medium storing computer-executable instructions for performing the steps recited in claim 18.

30. The method of claim 18, wherein the first stylus input is a tap.

* * * * *